United States Patent [19]

Hrabak et al.

[11] 3,954,683

[45] May 4, 1976

[54] 1,2,2,2-TETRACHLORETHYL ACRYLATE AND METHACRYLATE POLYMERS AND COPOLYMERS

[75] Inventors: Frantisek Hrabak; Milos Vacek, both of Prague, Czechoslovakia

[73] Assignee: Ceskoslovenska akademie ved, Prague, Czechoslovakia

[22] Filed: Aug. 12, 1974

[21] Appl. No.: 496,659

Related U.S. Application Data

[62] Division of Ser. No. 301,275, Oct. 27, 1972, Pat. No. 3,882,169.

[30] Foreign Application Priority Data

Oct. 28, 1971 Czechoslovakia .................. 7599-71
Oct. 28, 1971 Czechoslovakia .................. 7600-71

[52] U.S. Cl. .......................... 260/2.5 FP; 260/899; 526/292; 526/303; 526/329; 526/338; 526/342; 526/347

[51] Int. Cl.² ................. C08F 20/24; C08F 120/24; C08F 220/24

[58] Field of Search ....... 260/89.5 H, 83.5, 85.5 ES, 260/86.7, 86.1 R, 86.1 N, 87.3, 2.5 FP, 899

[56] References Cited

UNITED STATES PATENTS 2,680,105  6/1954  Baker .............................. 260/75 H
3,316,291  4/1967  Dowbenko ..................... 260/89.5 H

FOREIGN PATENTS OR APPLICATIONS 703,435  2/1954  United Kingdom ............ 260/89.5 H

OTHER PUBLICATIONS

J. Amer. Chem. Soc., Vol. 62, 3495 (1940) C. S. Marvel.

Primary Examiner—Joseph L. Schofer
Assistant Examiner—F. R. Cervi

[57] ABSTRACT

A compound having the formula

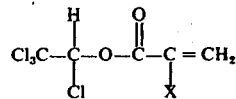

wherein X is hydrogen, chlorine or a methyl group; homo and copolymers thereof and flame resistant articles made from such polymers.

10 Claims, No Drawings

1,2,2,2-TETRACHLORETHYL ACRYLATE AND METHACRYLATE POLYMERS AND COPOLYMERS

This is a division application of Ser. No. 301,275 filed Oct. 27, 1972 U.S. Pat. No. 3,882,169.

This invention relates to a new group of tetrahalo substituted alkyl esters of α,β-monoethylenically unsaturated carboxylic acids, methods of making the same homo- and copolymers thereof and articles made from the polymers.

More particularly, the invention relates to tetrachloroalkyl acrylates and methacrylates, especially 1,2,2,2-tetrachloroethyl acrylates and methacrylates.

The 1,2,2,2-tetrachloroethyl acrylates and methacrylates have the following formula:

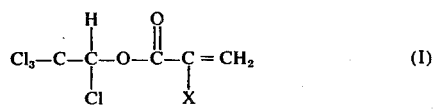

wherein X may be hydrogen, chlorine or lower alkyl and preferably X is hydrogen, chlorine or methyl.

Heretofore compounds as above described have not been known, nor have any methods of producing the same or of the homo- or copolymers thereof.

The compounds of the above formula (I) and especially the homo- and copolymers of 1,2,2,2-tetrachloroethyl acrylate and methacrylate may be employed as non-combustible organic glass, non-combustible foamed insulating materials, components of hardenable adhesives, putties analogous to "Dentakryl", noncombustible paints in the form of solutions, aqueous emulsions or suspensions. Non-combustible polymers, prepared according to this invention may be substituted for other plastics in most instances where non-combustibility is required.

It is an object of the present invention to provide a novel group of compounds designated as tetrahalo substituted lower alkyl esters of α,β- monoethylenically unsaturated carboxylic acids.

It is another object of the invention to provide a novel group of compounds designated tetrachloroethyl acrylates and methacrylates.

It is still another object of this invention to provide a method of making such compounds and also the homo- and copolymers thereof.

It is a further object of this invention to provide non-combustible articles prepared on the basis of such homo- and copolymers.

Further objects and advantages will become more apparent as the description of the invention proceeds.

Broadly speaking the instant invention includes the provision of a novel class of compounds designated as tetrachloroethyl acrylates and methacrylates, wherein the acrylate or methacrylate moiety thereof may contain an additional chlorine substituent.

The above described acrylate and methacrylate esters may be prepared by treatment of chloral with an acyl chloride of the formula

wherein x is as above described. Either the pure components or solutions thereof may be employed in the reaction. The reaction may be accelerated by the addition of small amounts of mineral acids, for example, concentrated sulfuric acid, hydrochloric acid and by the use of certain salts, for instance, ferric chloride. The reaction can also be carried out in the presence of an organic or inorganic base such as triethylamine, sodium carbonate and the like. The amount of mineral acid, salt or base used is however, not critical but should be between zero and 5% based on the weight of both reactants, usually between 0.04 and 0.5%.

When a buffer is used herein or in the polymerization step, this may for example be sodium bicarbonate, sodium acetate, or sodium dihydrogen phosphate in an amount of between 0.05% to about 1.0% based on the weight of the total reactants. Chain transfer agents which may be used, usually in an amount of between about 0.1% and about 2.0% based on the total monomer, include carbon tetrachloride, trichloroethylene, mercaptans, diisopropylxanthogen disulphide toluene and the like.

Where the synthesis is carried out in solution, those solvents which are non-reactive with the reactants should be employed. The solvent should preferably be anhydrous. Suitable solvents include benzene, diethylether, tetrachloromethane and the like. The solvent, when one is employed, is used in an amount sufficient to form a workable reaction medium, preferably in amounts between 50% and 100% based on the volume of both reactants.

The compounds of the invention are preferably prepared by adding the reactants to a sufficient volume of reaction medium which can include a suitable liquid solvent, accelator, base, buffer etc. The reactants may be brought into solution form by addition of the solvent, or they may be reacted by the addition thereto of a suitable liquid accelerator. Where the accelerator selected for use is a mineral salt, it is preferable that the reactants be present in the form of their solution. The reactants and accelerators may be used in anhydrous form and admixed with a suitable stabilizer, such as hydroquinone. The order of addition of the reactants is not critical, although it is preferred that the accelerator, when one is employed, be added to the mixture of solution of reactants. The addition then may be carried out in increments or the total amount of accelerator may be added at once. The reaction is generally exothermic and is advantageously carried out in an ice bath. It may however, also be carried out at reflux temperatures. A preferred reaction temperature range is from 20° to 60°C. The time of reaction will, in part, be determined by the temperature employed, the reactants involved and whether or not an accelerator is used. The ratio of the reactants may be varied over a wide range, although ordinarily the reactants will be employed in about stoichiometric quantities, preferably amounting to 1:1 molar.

The homo- and copolymers of the novel compounds of the invention may be prepared by free radical polymerization in either bulk, suspension, solution of emulsion systems utilizing therefor procedures known to the art. Suitable free radical initiators for the homo- or copolymerization include the free radicalsupplying polymerization catalysts yielding oxygen under the conditions of polymerization, as represented by the inorganic and organic peroxygen or peroxide compounds. As examples of such compounds, there may be mentioned hydrogen peroxide, metal and alkali metal peroxides such as sodium, potassium, barium and zinc peroxide, diacyl peroxides such as diacetyl, dibenzoyl and dilauroyl peroxide, dialkyl peroxides such as di-(tertiarybutyl) peroxide and di-(tertiary-butyl) hydroperoxide, cyclohexene peroxide, inorganic peroxygen acids such as perboric, persulfuric and peracetic acid and their ammonium, sodium and potassium salts, in addition to redox systems such as potassium or ammonium persulfate-sodium bisulfite. Other oxygen-yielding compounds or sources include atmospheric oxygen, ozone and the like.

Azo type catalysts, i.e., compounds containing the azo linkage, may also be employed. As example of such catalysts there may be mentioned $\alpha,\alpha'$-azobis-($\alpha,\gamma$-dimethylvaleronitrile), $\alpha,\alpha'$-azobis-($\alpha$-methyl butyronitrile), $\alpha,\alpha'$-azobis($\alpha$-ethyl butyronitrile), $\alpha,\alpha'$-azodiisobutyramide, dimethyl and diethyl, $\alpha,\alpha'$-azodiisobutyrate, and the like.

The preferred catalysts effective for the production of optimum results are the azo type, which may be employed along with an activator. Some typical activators are amines, metabisulfites, ascorbic acid, Fe salts and many other activators which are well known to those skilled in the art.

The polymerization will generally be carried out at a temperature effective to cause the initiator or catalyst to form free radicals and thus to propagate and maintain the reaction and preferably between 20° and 80°C. The catalyst may be employed in amounts ranging from 0.005 to 5.0% by weight based on the weight of the monomers, at a temperature of about 20° to 100° C and preferably 45° to 80° C.

The reaction is preferably carried out in an inert atmosphere, conveniently under a blanket of nitrogen, argon or the like, and at atmospheric pressure. Also anhydrous conditions should be used.

After the polymerization is effected upon completion of the solution and the heating period, the polymer may be observed to precipitate and may be recovered by filtration or evaporation of the solvent. The foregoing is applicable when emulsion, suspension or solution polymerization is carried out.

It will be understood that in carrying out the process of this invention, the known surface active agents, protective colloids, plasticizers, thickeners, and other additives may be added prior to, during or after the polymerization reaction is completed. Anionic, nonionic or cationic emulsifying agents may be employed. As examples of nonionic agents which may be employed, there may be mentioned the condensation products of a plurality of moles of ethylene oxide with organic compounds containing at least 8 carbon atoms and a reactive hydrogen atom such as the water insoluble carboxylic and sulfonic acids, alcohols, thiols, phenols, hydroxy carboxylic acids, carboxy and sulfonic acid amides, primary and secondary amines and hydroxyalkylamines. As specific examples of such nonionic agents there may be mentioned the reaction products of 1 mole of nonylphenol with 9 to 100 E.O. (moles ethylene oxide), 1 mole of castor oil with 20 E.O., 1 mole tall oil with 18 E.O., 1 mole of oleyl alcohol with 20 E.O., 1 mole of dodecyl mercaptan with 9 E.O., 1 mole of soybean oil amine with 10 E.O., 1 mole of rosin amine with 32 E.O., 1 mole of cocoanut fatty acid amine with 7 E.O., 1 mole of dinonyl phenol with 15 E.O., 1 mole of oxo tridecyl alcohol with 12 E.O., Pluronic L62 and the like.

Suitable anionic surface active agents include the sulfonic acids, sulfate esters, and phosphate esters (particularly the primary and secondary phosphate esters and mixtures thereof) of the above mentioned nonionic surface active agents as disclosed, for example, in U.S. Pat. Nos. 3,004,056 and 3,004,057. Other such anionic surface active agents include alkylaryl sulfonic acids such as dodecylbenzene sulfonic acid, alkyl sulfates such as sodium M-methyltaurides of higher ($C_{10}$ to $C_{20}$) fatty acids, and isothionates such as sodium N-methylisothionate esters of higher ($C_{10}$ to $C_{20}$), fatty acids.

Protective colloids and/or thickening agents may also be employed if desired such as polyvinyl alcohol, copolymers such as the copolymer of vinyl methyl ether and maleic anhydride, hydroxyethyl cellulose, carboxymethyl cellulose, natural gums and colloidal materials and the like. Viscosities of up to 80,000 cps. or more may thereby be obtained when required.

The order of addition of the monomers catalyst, emulsifier where employed, activator etc., is not critical. The monomers and catalyst, etc., may be added in increments or otherwise. It is preferred that a liquid medium be prepared from all of the monomers, catalyst and additional agents and that thereafter polymerization be initiated. Polymerization is effected through the ethylenically unsaturated linkage in the monomers, i.e., vinyl polymerization.

When the tetrachloroethyl acrylate or methacrylate is copolymerized with another monomer, said other monomer may be selected from among those vinyl, diene and conjugated diene monomers which are operative to copolymerize by the free radical mechanism. The vinyl monomer can be an alkenyl or mono alkenyl aromatic monomer i.e., diolefin, conjugated diolefin, vinyl aromatic or mono-ethylenically unsaturated monomer. The ratio of the monomers in the case of copolymerization may vary from 1:99 to 99:1 and preferably from 1:50 to 50:1.

By the term "conjugated diene" it is meant to include typically, butadiene-1,3; 2-methyl-butadiene-1,3; 2,3-dimethyl butadiene-1,3; piperylene; 2-neopentyl-butadiene-1,3; and other homologs of butadiene-1,3 and in addition, the substituted dienes, such as 2-chlorobutadiene-1,3; 2-cyano-butadiene-1,3; the substituted straight chain conjugated pentadienes, the straight-and-branch-chain hexadienes, and others. The butadiene-1,3 hydrocarbons because of their ability to produce particularly desirable polymeric materials, are preferred comonomers.

As to the mono olefin any normal alpha olefin having at least 4 carbon atoms and no more than 22 carbon atoms, may be used, the $C_4$-$C_{10}$ olefins being preferred. Branched olefins such as 3 methyl butene-1, 3-methyl hexene-1, 2-methyl butene-1,2,4,4-trimethyl pentene-1, 2-methyl pentene-1 and 2,4,4-trimethyl pentene-2 are operative. Among other alpha olefins which are applicable are octene-1, hexene-1, decene-1, octadecene-1, hexadecene-1, dodecene-1,tetradecene-1, cicosene-1, and the like.

By the term "monoalkenyl aromatic monomer" it is intended to include those monomers wherein an alkenyl group is attached directly to an aromatic nucleus containing about 6 to about 10 carbon atoms. These monomers may include alkyl, alkoxy and/or halo substituted compounds. Typical of these monomers are styrene, p-methylstyrene, α-methylstyrene, α-p-dimethyl styrene, α and β-bromovinyl benzene, α and β-chlorovinyl benzene, α,m-, or p-methoxy-vinyl benzene, o-p-diethyl styrene, p-chlorostyrene, isopropyl styrene, tert-butyl styrene, α-methyl-p-isopropyl styrene, α-chloro-p-methylstyrene, and α-p-dichlorostyrene and the like, and any mixtures thereof. Vinyl naphthalenes may also be used either alone, mixtures thereof or in combination with the styrene monomers. Because of its availability and ability to produce desirable polymers and for other reasons, it is preferred to use styrene as the monoalkenyl aromatic monomer. These chlorine-containing polymers can be used to impart flame retardancy to synthetic resins and foams alike.

The alpha,beta-olefinically unsaturated nitriles or primary amides are preferably the monoolefinically unsaturated nitriles having from 3 to 10 carbon atoms such as acrylonitrile methacrylonitrile, ethacrylonitrile and the like. Most preferred are acrylonitrile and methacrylonitrile.

In the following examples and in the appended claims, all parts and proportions are by weight unless otherwise noted.

The following examples are illustrative and are not to be considered as limiting.

Preparation of 1,2,2,2-tetrachloroethyl acrylate:

EXAMPLE 1

In a reactor vessel 0.5 grams of concentrated sulfuric acid was added to a mixture of 102 grams of anhydrous chloral and 62.6 grams of acryloyl chloride stabilized with hydroquinone. During the addition of the mixture to the reactor, it was stirred and cooled with ice water. A reaction immediately takes place. After it had ceased the resulting dark product was fractionated under reduced pressure or partial vacuum. The main fraction was collected in the amount of 107 grams at 63°C/0.5 Torr and then distilled five times through a descending condenser up to chromatographic purity. Distillation through an effective column is avoided because of the large loss due to polymerization. Refractive index and density of the fraction were as follows: $n_D^{20}$ 1.4862; $d_4^{20}$ 1.4633; $d_4^{50}$ 1.4247. The composition determined by the elemental analysis: C 25.95%, H 1.99% and Cl 58.53%. A standard calculated for 1,2,2,2-tetrachloroethyl acrylate: C 25.24%, H 1.69% and Cl 59.62%

EXAMPLE 2

Into a vessel a solution consisting of 14.7 grams of chloral and 10.4 grams of acryloyl chloride in 25 ml of benzene, 0.25 grams of anhydrous $FeCl_3$ was added. The reaction starts immediately and continues in the refluxing benzene. After the reaction was completed, the mixture was steam-distilled and the lower layer of the condensate was separated, dried and fractionated under reduced pressure. Chromatographically pure 1,2,2,2-tetrachloroethyl acrylate was obtained in the amount of 14.5 grams.

Preparation of 1,2,2,2-tetrachloroethyl methacrylate:

EXAMPLE 3

In a reactor vessel anhydrous $FeCl_3$ (0.25 grams) was added to a mixture consisting of 134 grams of anhydrous chloral and 95 grams of methacryloyl chloride, stabilized by hydroquinone. The mixture was stirred and cooled in the reactor in ice water. The reaction occurs quickly and after it had ceased, the resulting dark mixture was fractionated under reduced pressure. The main fraction was distilled at 70°C/0.4 Torr in the amount of 202 grams. It was refined by a threefold distillation through a descending condenser to chromatographic purity. Refractive index and density of the fraction was as follows: $n_D^{20}$ 1.4856, $d_4^{20}$ 1.4187, $d_4^{50}$ 1.3812. By the elemental analysis it was determined: C 28.98%, H 2.48% and Cl 55.08%; calculated for 1,2,2,2-tetrachloroethyl methacrylate: C 28.60%, H 2.40% and Cl 56.30%.

Preparation of the homo- and copolymers of the products of Examples 1 - 3

EXAMPLE 4

A solution of 0.0065 grams of 2,2'-azobisisobutyronitrile in 5 grams of 1,2,2,2-tetrachloroethyl acrylate (the product of Examples 1–2) was charged into a glass ampoule, and cooled to −78°C. The ampoule was flushed with nitrogen, sealed and placed into a temperature controlled bath heated to 60°C. A colorless, clear and elastic plug of the homo polymer thereof was formed after 20 hours. The plug burns in the flame of a gas burner, however, when removed from the flame, burning of the molten mass did not continue. The polymer did not dissolve in aromatic hydrocarbons, chlorinated hydrocarbons, alcohols or ketones, and its density, determined pycnometrically, was $d_4^{20}$ 1.7029.

EXAMPLE 5

A mixture of 2 grams of 1,2,2,2-tetrachloroethyl acrylate, 2 grams of styrene and 0.01 grams of benzoyl peroxide was prepared for polymerization as in Example 4. The contents of the ampoule are polymerized at 60°C for 20 hours to a colorless, slightly opalescent, elastic plug. The polymer dissolved neither in aromatic nor in chlorinated hydrocarbons and its inflammability was lower than that of pure polystyrene.

EXAMPLE 6

A solution of 3 grams of 1,2,2,2-tetrachloroethyl acrylate and 0.013 grams of 2,2'-azobisisobutyronitrile in 7 ml of benzene was homo polymerized in a glass dilatometer at a temperature 50°C to about 10 percent conversion of the monomer. After the calculated volume had been achieved, the content of the dilatometer was poured into a flask containing 80 ml of ethanol. The colorless polymer precipitated (0.35 grams), and dissolved in benzene as well as in tetrachloromethane.

EXAMPLE 7

A solution of 0.0065 grams of 2,2'-azobisisobutyrinitrile in 5 grams of 1,2,2,2-tetrachloroethyl methacrylate (the product of Example 3) was prepared for polymerization in the same way as described in Example 4. After 20 hours of heating at 60°C, a hard plug was formed. The density of the polymer was $d_4^{20}$ 1.6014. The polymer dissolved in aromatic and chlorinated hydrocarbons and ketones but did not dissolve in aliphatic hydrocarbons, alcohols or in water. It burns in the flame of a gas burner, but when removed from the flame, the molten mass extinguishes.

EXAMPLE 8

A glass ampoule was charged with 7 grams of isoprene, 2 grams of 1,2,2,2-tetrachloroethyl methacrylate, 0.05 grams of dodecylmercaptan, 0.04 grams of potassium persulfate, 0.5 grams of "Mersolate" (weight of a dry substance), and 18 grams of distilled water. The ampoule was cooled to −78°C, evacuated, sealed under vacuum and then placed into a container rotating in a water bath at a temperature 50°C. After 6 hours a latex forms and was poured into 200 ml of ethanol, which had been previously acidified with 0.5 ml of concentrated hydrochloric acid. The white polymer precipitated (2.7 grams), was rubberlike and soluble in benzene.

What is claimed:

1. A polymeric composition comprising approximately by weight (a) 100 to 1% of a monomer derived from the 1,2,2,2,-Tetrachloroethyl ester of the formula

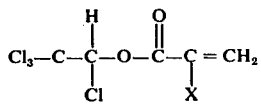

wherein X is selected from the group consisting of hydrogen, chlorine and methyl, said monomer (a) being copolymerized with (b) 0 to 99% of a monomer selected from the group consisting of olefins, diolefins, conjugated diolefins, a monoalkenyl aromatic moiety and a nitrogenous moiety.

2. A polymeric composition according to claim 1 containing 100% of component (a).

3. A polymeric composition according to claim 1 wherein component (b) is included in amounts of about 1 to 50% by weight.

4. A polymeric composition according to claim 1 wherein component (b) is selected from the group consisting of a 1,4 conjugated $C_{4-9}$ diene, a vinyl arylalkenyl monomer, an ester of a $\alpha,\beta$-monoethylenically unsaturated carboxylic acid and a primary amide of an B-monoethylenically unsaturated carboxylic acid.

5. A polymeric composition according to claim 4 wherein said diene is an isoprene or butadiene, said vinyl aryl alkenyl monomer is a vinyl toluene, said carboxylic acid ester is a lower alkyl acrylate or methacrylate and said primary amide is acrylamide.

6. A method for preparing the composition according to claim 1 comprising polymerizing components a) and b) in the presence of a free radical catalyst at a temperature of about 30° to about 100°C.

7. A method according to claim 6 which comprises carrying out said polymerization in a liquid medium.

8. A flame retardant material containing as an essential ingredient a polymer defined in claim 1 in an amount sufficient to prevent flammability.

9. A flame retardant synthetic resin carrier containing an amount of the polymer as defined in claim 1 effective to prevent flammability.

10. A flame retardant synthetic foamed resinous material containing an amount of the polymer according to claim 1 effective to prevent flammability.

* * * * *